US008065313B2

(12) United States Patent
Yagnik

(10) Patent No.: US 8,065,313 B2
(45) Date of Patent: Nov. 22, 2011

(54) METHOD AND APPARATUS FOR AUTOMATICALLY ANNOTATING IMAGES

(75) Inventor: Jay N. Yagnik, Mountain View, CA (US)

(73) Assignee: Google Inc., Mountain View, CA (US)

(*) Notice: Subject to any disclaimer, the term of this patent is extended or adjusted under 35 U.S.C. 154(b) by 292 days.

(21) Appl. No.: 11/492,485

(22) Filed: Jul. 24, 2006

(65) Prior Publication Data
US 2008/0021928 A1 Jan. 24, 2008

(51) Int. Cl.
G06F 7/00 (2006.01)
G06F 17/30 (2006.01)
G06F 12/00 (2006.01)
G06F 15/16 (2006.01)

(52) U.S. Cl. ........................................ 707/758; 707/899
(58) Field of Classification Search ................ 707/104.1
See application file for complete search history.

(56) References Cited

U.S. PATENT DOCUMENTS

| 5,945,982 | A * | 8/1999 | Higashio et al. ........................ 1/1 |
| 5,983,237 | A * | 11/1999 | Jain et al. .................... 707/104.1 |
| 6,317,740 | B1 * | 11/2001 | Mukherjea et al. ............ 707/758 |
| 6,480,841 | B1 * | 11/2002 | Higashio et al. ........................ 1/1 |
| 6,594,386 | B1 * | 7/2003 | Golshani et al. .............. 382/166 |
| 6,629,097 | B1 * | 9/2003 | Keith .................................. 1/1 |
| 6,650,772 | B1 * | 11/2003 | Inoue et al. .................... 382/162 |
| 6,697,998 | B1 * | 2/2004 | Damerau et al. .............. 715/260 |
| 6,711,287 | B1 * | 3/2004 | Iwasaki .......................... 382/165 |
| 6,804,684 | B2 * | 10/2004 | Stubler et al. ............... 707/104.1 |
| 7,035,461 | B2 * | 4/2006 | Luo et al. ....................... 382/167 |
| 7,143,434 | B1 * | 11/2006 | Paek et al. ...................... 725/142 |
| 7,254,285 | B1 * | 8/2007 | Paek et al. ...................... 382/305 |
| 7,394,947 | B2 * | 7/2008 | Li et al. .......................... 382/305 |
| 7,460,735 | B1 * | 12/2008 | Rowley et al. ................. 382/305 |
| 7,506,024 | B2 * | 3/2009 | Benitez et al. ................. 709/203 |
| 7,624,337 | B2 * | 11/2009 | Sull et al. ....................... 715/201 |
| 7,653,635 | B1 * | 1/2010 | Paek et al. ................... 707/999.1 |
| 7,657,089 | B2 * | 2/2010 | Li et al. .......................... 382/170 |
| 2003/0110181 | A1 * | 6/2003 | Schuetze et al. ........... 707/103 R |
| 2004/0049734 | A1 | 3/2004 | Simske |
| 2004/0194028 | A1 * | 9/2004 | O'Brien ......................... 715/517 |
| 2005/0069207 | A1 * | 3/2005 | Zakrzewski et al. .......... 382/190 |
| 2006/0041564 | A1 * | 2/2006 | Jain et al. ....................... 707/100 |

(Continued)

FOREIGN PATENT DOCUMENTS
EP 1304625 A2 4/2003

OTHER PUBLICATIONS

Lei Wang et al., Automatic Image Annotation and Retrieval Using Weighted Feature Selection, Multimed Tools Appl (2006), Springer Science + Business Media, LLC, 2006.

Primary Examiner — Mohammad Ali
Assistant Examiner — Griselle Corbo
(74) Attorney, Agent, or Firm — Park, Vaughan, Fleming & Dowler LLP

(57) ABSTRACT

One embodiment of the present invention provides a system that automatically annotates an image. During operation, the system receives the image. Next, the system extracts image features from the image. The system then identifies other images which have similar image features. The system next obtains text associated with the other images, and identifies intersecting keywords in the obtained text. Finally, the system annotates the image with the intersecting keywords.

38 Claims, 2 Drawing Sheets

U.S. PATENT DOCUMENTS

| | | | |
|---|---|---|---|
| 2006/0136391 A1* | 6/2006 | Morris | 707/3 |
| 2006/0173560 A1* | 8/2006 | Widrow | 700/48 |
| 2006/0239515 A1* | 10/2006 | Zhang et al. | 382/118 |
| 2007/0008321 A1* | 1/2007 | Gallagher et al. | 345/473 |
| 2007/0033521 A1* | 2/2007 | Sull et al. | 715/523 |
| 2007/0078846 A1* | 4/2007 | Gulli et al. | 707/5 |
| 2007/0081744 A1* | 4/2007 | Gokturk et al. | 382/305 |
| 2007/0098303 A1* | 5/2007 | Gallagher et al. | 382/305 |
| 2007/0101387 A1* | 5/2007 | Hua et al. | 725/113 |
| 2007/0214114 A1* | 9/2007 | Liu et al. | 707/3 |
| 2007/0236583 A1* | 10/2007 | Vuong et al. | 348/231.99 |
| 2007/0239683 A1* | 10/2007 | Gallagher | 707/3 |
| 2007/0239756 A1* | 10/2007 | Li et al. | 707/102 |
| 2007/0239778 A1* | 10/2007 | Gallagher | 707/104.1 |
| 2007/0245400 A1* | 10/2007 | Paek et al. | 725/142 |
| 2007/0271226 A1* | 11/2007 | Zhang et al. | 707/3 |
| 2008/0002916 A1* | 1/2008 | Vincent et al. | 382/305 |
| 2010/0205202 A1* | 8/2010 | Yang et al. | 707/767 |

* cited by examiner

METHOD AND APPARATUS FOR AUTOMATICALLY ANNOTATING IMAGES

BACKGROUND

1. Field of the Invention

The present invention relates techniques for automatically annotating images. More specifically, the present invention relates a technique that automatically annotates an image by searching for similar images and correlating text surrounding these similar images.

2. Related Art

The recent proliferation of high-bandwidth Internet connections presently makes it possible for millions of users to efficiently view images on the Internet. These developments have led to a tremendous increase in the number of images that are incorporated into web pages, web portals, and other web-based applications. Unfortunately, many images do not come with accompanying textual information, such as labels, captions, or titles, to describe the content of the images. This makes it extremely difficult to search for specific images because most existing search techniques are text based (e.g., a keyword search). Hence, it is highly desirable to annotate such images with relevant text, for example, by adding a set of keywords or a caption to describe the semantic content of an image.

Traditional techniques for annotating images are primarily manual, which can require human indexers to select keywords for thousands or, in some cases, millions of images. Hence, manual image annotation can be an extremely labor-intensive and expensive procedure.

Other techniques have been developed to automatically annotate an image (see "Formulating Semantic Image Annotation as a Supervised Learning Problem," G. Carneiro and N. Vasconcelos, *Proceedings of IEEE Conference on Computer Vision and Pattern Recognition*, San Diego, 2005). These automatic image-annotation techniques can significantly reduce or eliminate the human effort required to annotate very large image collections.

However, these existing "automatic annotation" techniques typically still involve steps that require some degree of human assistance, such as requiring manual labeling of a set of ground truth data, or by requiring other types of human interaction or feedback. Unfortunately, this human assistance cannot be efficiently scaled to match the exponentially growing number of images which need to be annotated.

Hence, what is need is a method and an apparatus for automatically annotating an image without the above-described problems.

SUMMARY

One embodiment of the present invention provides a system that automatically annotates an image. During operation, the system receives the image. Next, the system extracts image features from the image. The system then identifies other images which have similar image features. The system next obtains text associated with the other images, and identifies intersecting keywords in the obtained text. Finally, the system annotates the image with the intersecting keywords.

In a variation on this embodiment, the system extracts the image features from the image by: (1) partitioning the image into tiles; and (2) extracting the image features from the tiles.

In a further variation on this embodiment, for each given tile size in a set of differing tile sizes, the system partitions the image into tiles of the given tile size.

In a variation on this embodiment, prior to identifying the other images, the system matches the extracted image features against known image features in an image-feature library.

In a further variation on this embodiment, the system combines the matched image features to form one or more image-feature-combinations for the image.

In a further variation, the system identifies the other images which have similar image features by identifying similar image-feature-combinations in the other images.

In a variation on this embodiment, the system can extract the image features from the image by: (1) generating color histograms; (2) generating orientation histograms; (3) using a direct cosine transform (DCT) technique; (4) using a principal component analysis (PCA) technique; or (5) using a Gabor wavelet technique.

In a variation on this embodiment, the image features can be defined in terms of: (1) shapes; (2) colors; and (3) textures.

In a variation on this embodiment, the system identifies the other images by searching through images on the Internet.

In a variation on this embodiment, the system identifies the other images which have similar image features by using probability models.

In a variation on this embodiment, prior to identifying the intersecting keywords, the system expands keywords in the obtained text by adding synonyms for the keywords.

In a variation on this embodiment, the system receives the image from a video.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Most image search and retrieval systems are text-driven wherein a user inputs keywords as queries, and a computer system, or more specifically, a search engine, processes the queries by searching through test associated with images in an image database. The search engine returns "relevant" images which are associated with textual information that matches the keywords. In this type of scheme, it is not possible for an un-annotated image to be retrieved, even if the image content is highly relevant to the keywords. Hence, providing relevant textual information for un-annotated images can facilitate search and retrieval operations for the images.

One embodiment of the present invention provides a technique that automatically annotates an image by generating text relevant to the image by using the vast image base that is available on the web. More specifically, one embodiment of the present invention extracts image features from a given image, and then searches through images on the Internet to identify a set of images which contain similar images features. Next, the text surrounding these images is obtained. The technique subsequently identifies common keywords in the obtained text which are used to annotate the given image. Note that this technique requires no human intervention, and utilizes many existing image-processing techniques to perform steps such as image feature extraction and identifying similar images on the web.

Automatic Annotation Procedure

Figure 1:
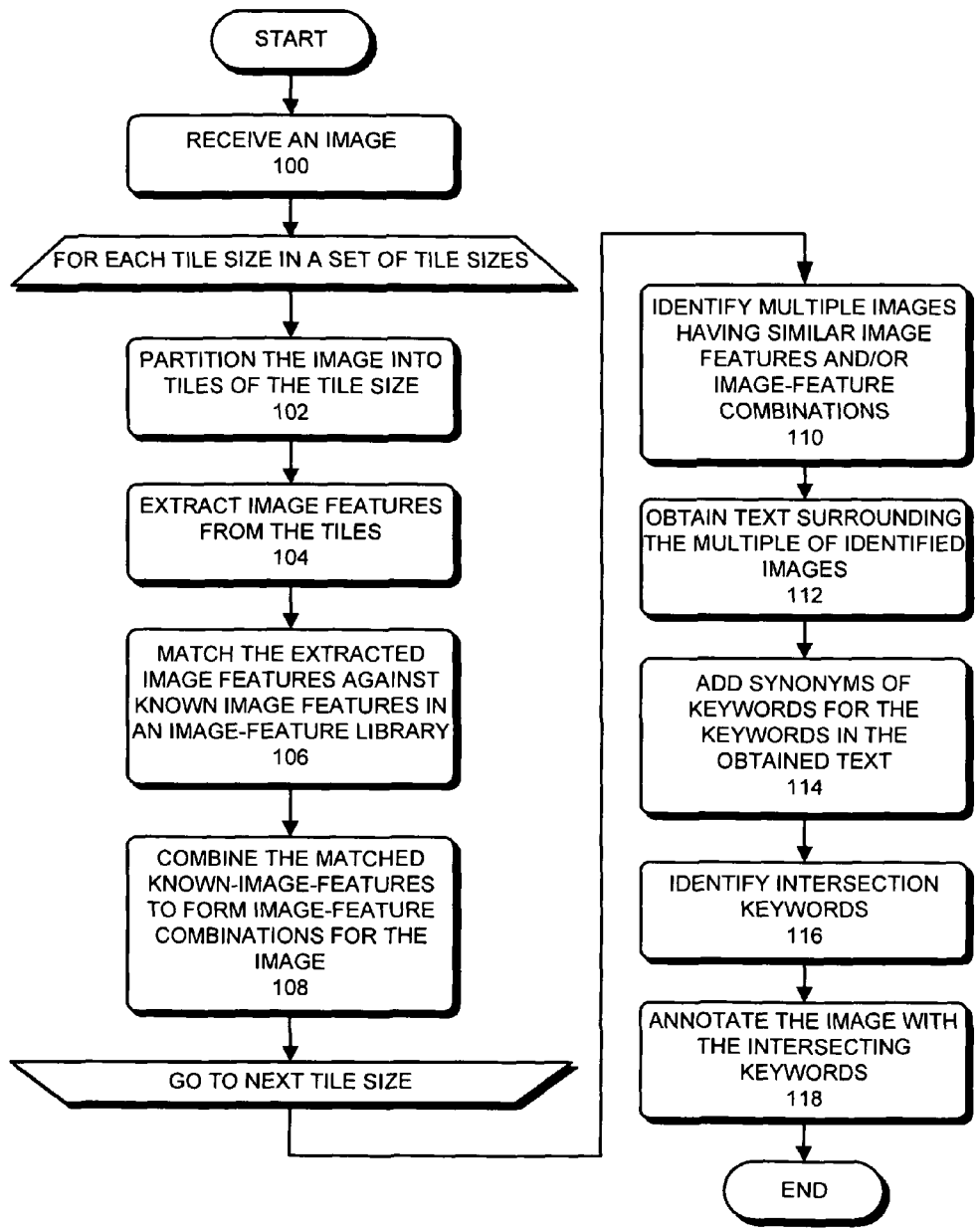
FIG. 1 presents a flowchart illustrating the process of automatically annotating an image in accordance with an embodiment of the present invention.

FIG. 1 presents a flowchart illustrating the process of automatically annotating an image in accordance with an embodiment of the present invention.

The process starts with receiving an image, and a request to provide relevant textual information to the image (step 100). Note that the image may be formatted and stored in any digital format, including but are not limited to: JPEG, GIF, BMP, TIFF, PDF, PS, EMF, MNG, PNG, PSD, SWF and WMF. In addition, the image can also be obtained from still frames of a digital video. For example, we can extract an image from a single frame in a MPEG video and subsequently annotate this image.

Next, the process partitions the image into tiles of a specific size (step 102), and subsequently extracts image features from the tiles (step 104). Note that typical image features which can be extracted from these tiles can include, but are not limited to: shapes, colors, and textures. For example, several color features for a given tile in the image can be extracted, wherein the color features can include, but are not limited to: color histograms, a color histogram layout, and color moments. Furthermore, a number of image-processing techniques can be used to extract specific image features, wherein these image-processing techniques can include, but are not limited to: a direct cosine transform (DCT) technique, a principal component analysis (PCA) technique, and a Gabor wavelet technique. In one embodiment of the present invention, the image features can also include orientation histograms.

Also note that the present invention is not limited to features which are associated with tiles. The present invention can generally be used with any type of image feature, and is not limited to image features associated with tiles. For example, the present invention can be used with image features which are not associated with tile boundaries, such as attributes of a color histogram for the entire image.

The process then matches the extracted image features against known image features in an image-feature library (step 106). In one embodiment of the present invention, the known image features in the library were previously obtained using a similar image extraction technique. For example, the known image features can be represented by DCT coefficients if a DCT technique is used to extract the image features in step 104. In one embodiment of the present invention, matching the extracted image features against the known image features involves matching each extracted image feature to the nearest known image features in the library.

Next, the process combines the matched known-image-features to form image-feature combinations for the image (step 108). More specifically, the process generates a set of image-feature combinations for the image partitioned at the specific tile sizes.

In one embodiment of the present invention, steps 102 to 108 are repeated iteratively for different tile sizes, wherein the tile sizes can range from only a number of pixels per tile up to a single tile containing the entire image. Specifically, for each tile size, the process partitions the image into tiles of that tile size and then extracts image features from the corresponding tiles. The process then matches extracted image features to the known image features and subsequently uses the known image features to produce a set of image-feature combinations for the image. Hence, the resulting image-feature combinations from step 108 comprise image-feature combinations obtained for different image tile sizes. Note that using different tile sizes facilitates capturing image features on multiple scales. Instead of matching to known image features, the system can alternatively restrict the values of the image features to fall into a limited set of discrete values.

The process next identifies multiple other images which have similar image features and/or image-feature combinations (step 110). Specifically, the process searches through a large number of images from various sources. These image sources can include, but are not limited to, images stored in organized image databases, images embedded in webpages on the Internet, images associated with videos on the Internet, or any image that is linked to a web address on the Internet. Note that the difference between images on the Internet and the images in the organized image databases is that the images on the Internet are typically not classified and are typically uncorrelated.

Determining if a particular image includes similar image features to the original image involves processing the particular image in the same manner as the original image to generate image features for the particular image.

While comparing the image features and/or image-feature combinations in the original image with another image, various probability models can be applied. For example, these probability models can include anything from a simple counting technique, which counts the number of similar or identical features, to a complex "multivariate distribution technique," which assumes a multivariate normal distribution of features when comparing two images. (For a discussion of multivariate normal distributions, please see "http://en.wikipedia.org/wiki/Multivariate_gaussian_distribution".)

After the multiple similar images are identified, the process obtains text surrounding these images (step 112). In one embodiment of the present invention, the text is obtained around the image tag in the HTML file that includes the link to the image. In another embodiment, the text directly surrounding the actual image in a page is obtained. It is assumed that the text found in the vicinity of a given image on the web has high probability being relevant to the content of the image. As a result, step 112 uses keywords from the text surrounding each identified image as candidate keywords for annotating the original image. Note that some of these candidate keywords may not be relevant to the content of the original image.

The process then expands the set of keywords associated with each identified image by adding synonyms for the set of keywords (step 114). In one embodiment of the present invention, intelligent thesaurus tools are used to add synonyms for each keyword in the set. For example, keywords "sea" and "ocean" may appear in two sets of keywords for two identified images, respectively. After expanding the keywords this way, both images will be associated with both keywords.

Next, the process performs comparisons between sets of keywords for those identified images, to identify intersecting keywords (step 116). Note that adding synonyms to the keywords increases the probability of identifying such intersections.

Finally, the process takes the intersecting keywords between the multiple identified images, and annotates the original image with the intersecting keywords (step 118). Note that the relevance of the intersecting keywords to the original image can be improved by identifying more images in step 110. Because the Internet is an enormously large image database, the probability of finding better matched images increases as more and more images are searched and examined. Furthermore, the intersecting keywords obtained from more images become more accurate as well.

System

Figure 2:
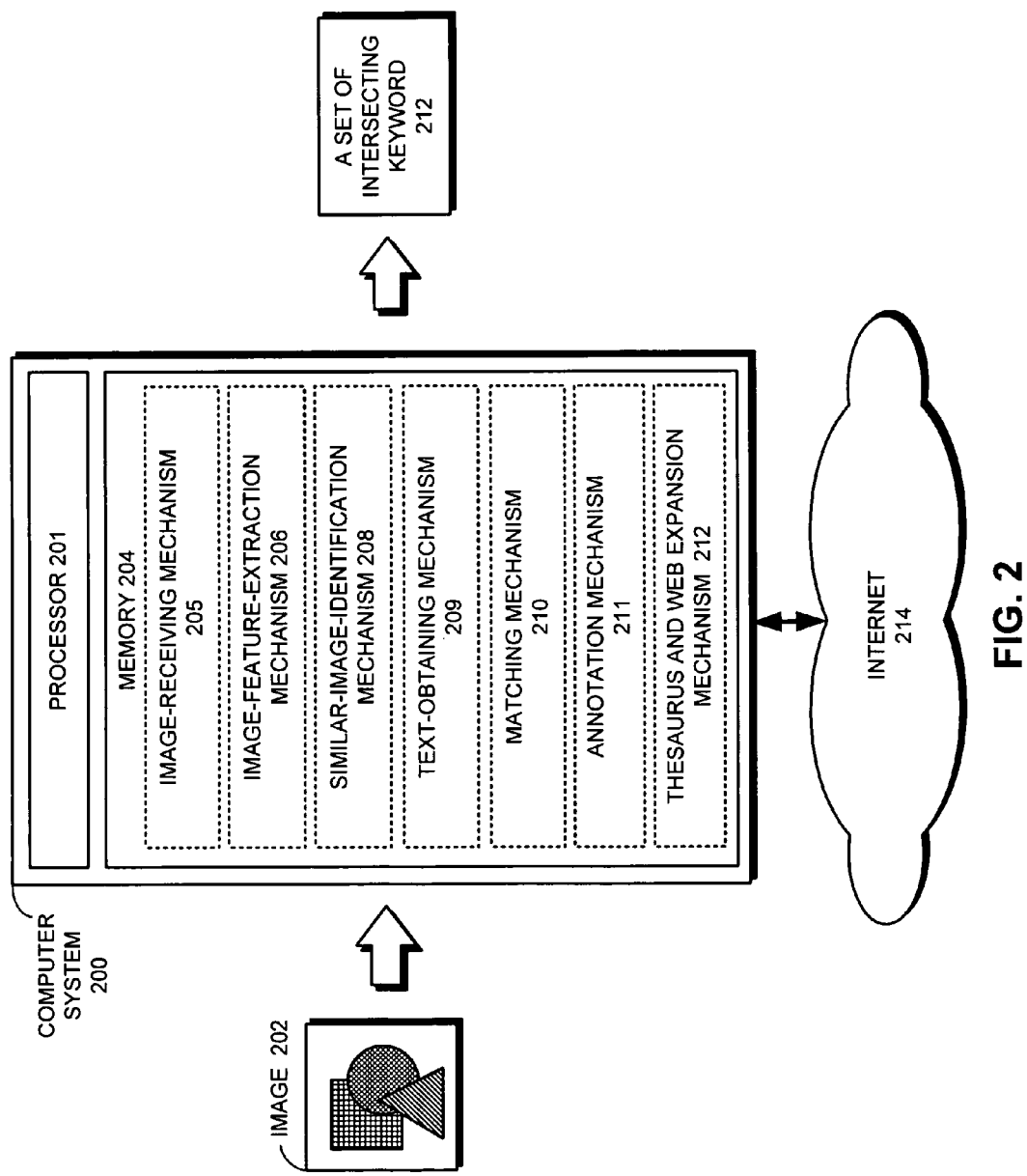
FIG. 2 illustrates a computer-based system for automatically annotating an image in accordance with an embodiment of the present invention.

FIG. 2 illustrates a computer-based system for automatically annotating an image in accordance with an embodiment of the present invention. This computer-based system operates within a computer system 200, which can generally include any type of computer system, including, but not limited to, a computer system based on a microprocessor, a mainframe computer, a digital signal processor, a portable computing device, a personal organizer, a device controller, and a computational engine within an appliance.

During operation, computer system 200 receives an image 202 and a request to annotate image 202 with relevant textual information.

Computer system 200 includes a processor 201 and a memory 204. Memory 204 can include any type of memory that can store software modules that implement functions described in FIG. 1 for annotating image 202. As is illustrated in FIG. 2, these software modules can include: an image-receiving mechanism 205 which receives an image, an image-feature extraction mechanism 206 which extracts image features from an image; a similar-image-identification mechanism 208 which identifies images containing similar image features to input image 202; a text-obtaining mechanism which obtains text to be used to annotate an image; a matching mechanism 210 which matches an image with similar images; an annotation mechanism 211 which annotates an image; and a thesaurus and web expansion mechanism 212 which expands a list of keywords to include synonyms of the keywords. These mechanisms operate collectively to produce a set of intersecting keywords 212 which is then used to annotate image 202.

Note that computer system 200 interfaces with Internet 214 to access images on Internet 214.

Application to Videos

Note that the present invention can also be used to annotate videos which do not have titles or descriptions, thereby facilitating search and retrieval operation for these videos. Specifically, a video can be partitioned into a set of representative frames, and each frame can be processed as an image. Using the above-described process, each of these representative frames can be annotated with relevant keywords. One can choose to use other existing techniques to analyze the annotations for these frames in order to generate a set of common annotations for the entire video.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically annotating a video in a computer system, comprising:
   receiving a video comprising a plurality of frames;
   obtaining images contained in two or more representative frames from the video;
   for each of the images,
      iteratively extracting image features from the image on different spatial scales, wherein the image features comprise visual characteristics associated with tiles of different sizes within the image;
      matching the extracted image features to known image features;
      identifying other images with similar image features using one or more combinations of the matched image features;
      obtaining text associated with the other images, wherein obtaining the text associated with the other images comprises obtaining text that surrounds each image in a web page in which the image is located;
      identifying one or more intersecting keywords in the text associated with the other images; and
      annotating the image with the intersecting keywords using the computer system;
   analyzing the keywords for the images to determine a common set of keywords; and
   annotating the video using the common set of keywords.

2. The method of claim 1, wherein iteratively extracting the image features from the image involves:
   partitioning the image into the tiles of different sizes; and
   extracting the image features from the tiles.

3. The method of claim 2, wherein for each given tile size in the different sizes, partitioning the image into the tiles involves partitioning the image into tiles of the given tile size.

4. The method of claim 1, further comprising combining the matched image features to form one or more image-feature combinations for the image.

5. The method of claim 4, wherein identifying the other images with the similar image features involves identifying similar image-feature combinations in the other images.

6. The method of claim 1, wherein iteratively extracting the image features from the image involves one or more of:
   generating color histograms;
   generating orientation histograms;
   using a direct cosine transform (DCT) technique;
   using a principal component analysis (PCA) technique; and
   using a Gabor wavelet technique.

7. The method of claim 1, wherein the image features are defined in one or more of the following terms:
   shapes;
   colors; and
   textures.

8. The method of claim 1, wherein identifying the other images with the similar image features involves searching through images on Internet.

9. The method of claim 1, wherein identifying the other images with the similar image features involves using probability models.

10. A non-transitory computer-readable storage medium storing instructions that when executed by a computer cause the computer to perform a method for automatically annotating a video, the method comprising:

receiving a video comprising a plurality of frames;
obtaining images contained in two or more representative frames from the video;
for each of the images,
- iteratively extracting image features from the image on different spatial scales, wherein the image features comprise visual characteristics associated with tiles of different sizes within the image;
- matching the extracted image features to known image features;
- identifying other images with similar image features using one or more combinations of the matched image features;
- obtaining text associated with the other images, wherein obtaining the text associated with the other images comprises obtaining text that surrounds each image in a web page in which the image is located;
- identifying one or more intersecting keywords in the text associated with the other images; and
- annotating the image with the intersecting keywords;

analyzing the keywords for the images to determine a common set of keywords; and
annotating the video using the common set of keywords.

11. The non-transitory computer-readable storage medium of claim 10, wherein iteratively extracting the image features from the image involves:
partitioning the image into the tiles of different sizes; and
extracting the image features from the tiles.

12. The non-transitory computer-readable storage medium of claim 11, wherein for each given tile size in the different sizes, partitioning the image into the tiles involves partitioning the image into tiles of the given tile size.

13. The non-transitory computer-readable storage medium of claim 10, wherein the method further comprises combining the matched image features to form one or more image-feature combinations for the image.

14. The non-transitory computer-readable storage medium of claim 13, wherein identifying the other images with the similar image features involves identifying similar image-feature combinations in the other images.

15. The non-transitory computer-readable storage medium of claim 10, wherein iteratively extracting the image features from the image involves one or more of:
generating color histograms;
generating orientation histograms;
using a direct cosine transform (DCT) technique;
using a principal component analysis (PCA) technique; and
using a Gabor wavelet technique.

16. The non-transitory computer-readable storage medium of claim 10, wherein the image features are defined in one or more of the following terms:
shapes;
colors; and
textures.

17. The non-transitory computer-readable storage medium of claim 10, wherein identifying the other images with the similar image features involves searching through images on Internet.

18. The non-transitory computer-readable storage medium of claim 10, wherein identifying the other images with the similar image features involves using probability models.

19. A computer system that automatically annotates an image, comprising:
a processor;
a memory;
an obtaining mechanism configured to obtain images contained in two or more representative frames from a video that comprises a plurality of frames;
wherein the computer system is configured to process each of the images obtained from the representative frames using the following mechanisms:
- an extraction mechanism configured to iteratively extract image features from a image on different spatial scales, wherein the image features comprise visual characteristics associated with different sizes within the image;
- a matching mechanism configured to match the extracted image features to known image features;
- an identification mechanism configured to:
  - identify other images with similar image features using one or more combinations of the matched image features; and
  - obtain text associated with the other images, wherein obtaining the text associated with the other images comprises obtaining text that surrounds each image in a web page in which the image is located;
  - identify one or more intersecting keywords in the text associated with the other images; and
- an annotation mechanism configured to annotate the image with the intersecting keywords;
an analysis mechanism configured to analyze the keywords for the images to determine a common set of keywords, wherein the annotation mechanism is configured to annotate the video using the common set of keywords.

20. The computer system of claim 19, wherein the extraction mechanism is configured to:
partition the image into the tiles of different sizes; and to
extract the image features from the tiles.

21. The computer system of claim 19, wherein the matching mechanism is configured to combine the matched image features to form one or more image-feature combinations for the image.

22. The computer system of claim 21, wherein the identification mechanism is configured to identify similar image-feature combinations in the other images.

23. A method for automatically annotating a composite visual medium in a computer system, comprising:
annotating two or more visual mediums from within a composite visual medium that comprises a plurality of visual mediums by, for each of the visual mediums:
- iteratively extracting features from the visual medium on different spatial scales, wherein the features comprise visual characteristics associated with tiles of different sizes within the visual medium;
- matching the extracted features to known features;
- identifying other visual media with similar features using one or more combinations of the matched features;
- obtaining text associated with the other visual media, wherein obtaining the text associated with the other visual media comprises obtaining text that surrounds each visual media in a web page in which the visual media is located;
- identifying one or more intersecting keywords in the text associated with the other visual media; and
- annotating the visual medium with the intersecting keywords using the computer system;

analyzing the keywords for the two or more visual mediums to determine a common set of keywords; and annotating the composite visual medium using the common set of keywords.

24. The method of claim 23, wherein iteratively extracting the features from the visual medium involves:

partitioning an image within the visual medium into tiles of different sizes; and extracting image features from the tiles.

25. The method of claim 24, wherein for each given tile size in the different sizes, partitioning the image into the tiles involves partitioning the image into the tiles of the given tile size.

26. The method of claim 23, wherein the method further comprises combining the matched features to form one or more feature combinations for the visual medium.

27. The method of claim 26, wherein identifying the other visual media with similar features involves identifying the one or more feature combinations in the other visual media.

28. The method of claim 23, wherein iteratively extracting the features from the visual medium involves one of more of:

generating color histograms;

generating orientation histograms;

using a direct cosine transform (DCT) technique;

using a principal component analysis (PCA) technique; and using a Gabor wavelet technique.

29. The method of claim 23, wherein the features are defined in one or more of the following terms:

shapes;

colors; and textures.

30. A non-transitory computer-readable storage medium storing instructions that when executed by a computer cause the computer to perform a method for automatically annotating a composite visual medium, the method comprising:

annotating two or more visual mediums from within a composite visual medium that comprises a plurality of visual mediums by, for each of the visual mediums:

iteratively extracting features from a received the visual medium on different spatial scales, wherein the features comprise visual characteristics associated with tiles of different sizes in an image within the visual medium;

matching the extracted features to known features;

identifying other visual media with similar features using one or more combinations of the matched image features;

obtaining text associated with the other visual media, wherein obtaining the text associated with the other visual media comprises obtaining text that surrounds each visual media in a web page in which the visual media is located;

identifying one or more intersecting keywords in the text associated with the other visual media; and annotating the visual medium with the intersecting keywords;

analyzing the keywords for the two or more visual mediums to determine a common set of keywords; and annotating the composite visual medium using the common set of keywords.

31. A method for automatically annotating a video in a computer system, comprising:

iteratively extracting video features from a received video on different spatial scales, wherein the video features comprise visual characteristics associated with the tiles of different sizes in an image within the video;

matching the extracted video features to known video features;

identifying other videos with similar video features to the extracted video features using one or more combinations of the matched image features;

obtaining text associated with the other videos, wherein obtaining the text associated with the other videos comprises obtaining text that surrounds each video in a web page in which the video is located;

identifying one or more intersecting keywords in the text associated with the other videos; and annotating the received video with the intersecting keywords using the computer system.

32. The method of claim 31, wherein iteratively extracting the video features from the received video involves:

partitioning the image within the video into the tiles of different sizes; and extracting the image features from the tiles.

33. The method of claim 32, wherein for each given tile size in the different sizes, partitioning the image within the video into the tiles involves partitioning the image within the video into the tiles of the given tile size.

34. The method of claim 31, wherein the method further comprises combining the matched video features to form one or more video-feature combinations for the received video.

35. The method of claim 34, wherein identifying the other videos with the similar video features involves identifying similar video-feature combinations in the other videos.

36. The method of claim 31, wherein iteratively extracting the video features from the received video involves one or more of:

generating color histograms;

generating orientation histograms;

using a direct cosine transform (DCT) technique;

using a principal component analysis (PCA) technique; and using a Gabor wavelet technique.

37. The method of claim 31, wherein the video features are defined in one or more of the following terms:

shapes;

colors; and textures.

38. A non-transitory computer-readable storage medium storing instructions that when executed by a computer cause the computer to perform a method for automatically annotating a video, the method comprising:

iteratively extracting video features from a received video on different spatial scales, wherein the video features comprise visual characteristics associated with tiles of different sizes in an image within the video;

matching the extracted video features to known video features;

identifying other videos with similar video features to the extracted video features using one or more combinations of the matched image features;

obtaining text associated with the other videos, wherein obtaining the text associated with the other videos comprises obtaining text that surrounds each video in a web page in which the video is located;

identifying one or more intersecting keywords in the text associated with the other videos; and annotating the received video with the intersecting keywords.

* * * * *